United States Patent
Hu et al.

(10) Patent No.: US 9,591,346 B2
(45) Date of Patent: Mar. 7, 2017

(54) CONTENT DELIVERY SYSTEM WITH CONTENT SHARING MECHANISM AND METHOD OF OPERATION THEREOF

(75) Inventors: Yuchang Hu, Santa Clara, CA (US); Anton Treskunov, Sunnyvale, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 402 days.

(21) Appl. No.: 13/470,553

(22) Filed: May 14, 2012

(65) Prior Publication Data

US 2013/0304817 A1    Nov. 14, 2013

(51) Int. Cl.
| | |
|---|---|
| G06F 15/16 | (2006.01) |
| H04N 21/414 | (2011.01) |
| H04L 29/06 | (2006.01) |
| H04W 52/02 | (2009.01) |
| H04W 4/02 | (2009.01) |
| G06Q 10/10 | (2012.01) |
| H04N 21/442 | (2011.01) |
| H04N 21/45 | (2011.01) |
| H04N 21/4788 | (2011.01) |
| H04N 21/488 | (2011.01) |

(52) U.S. Cl.
CPC ....... *H04N 21/41407* (2013.01); *G06Q 10/10* (2013.01); *H04L 29/06* (2013.01); *H04N 21/41415* (2013.01); *H04N 21/44218* (2013.01); *H04N 21/4532* (2013.01); *H04N 21/4788* (2013.01); *H04N 21/4882* (2013.01); *H04W 4/021* (2013.01); *H04W 52/0254* (2013.01)

(58) Field of Classification Search
CPC .. H04L 29/06; H04W 4/021; H04W 52/0254; G06Q 10/10

USPC ............... 709/204; 725/34, 9-14, 74-82
See application file for complete search history.

(56) References Cited

U.S. PATENT DOCUMENTS

| | | | |
|---|---|---|---|
| 7,966,638 | B2 | 6/2011 | Gossweiler, III et al. |
| 8,516,087 | B2 | 8/2013 | Wilson et al. |
| 2006/0053377 | A1 | 3/2006 | Newell et al. |
| 2007/0192486 | A1 | 8/2007 | Wilson et al. |
| 2007/0288970 | A1 | 12/2007 | Tedenvall |

(Continued)

FOREIGN PATENT DOCUMENTS

| | | |
|---|---|---|
| CN | 1658149 A | 8/2005 |
| CN | 101854561 A | 10/2010 |

(Continued)

OTHER PUBLICATIONS

Arthur et al., "Privacy-aware shared UI toolkit for nomadic environments", "Software—Practice and Experience", Oct. 29, 2010, p. 28 Publisher: Wiley Online Library (wileyonlinelibrary.com) 2011, Published in: Provo, Utah, United States.

(Continued)

*Primary Examiner* — Chris Parry
*Assistant Examiner* — Weiwei Stiltner
(74) *Attorney, Agent, or Firm* — IP Investment Law Group

(57) ABSTRACT

A method of operation of a content delivery system includes: detecting a person's presence for identifying a portable device; determining an audience type based on the person's presence for determining a content type presentable on a public device; and distributing a display content based on the audience type for displaying on the portable device, the public device, or a combination thereof.

20 Claims, 6 Drawing Sheets

(56) References Cited

U.S. PATENT DOCUMENTS

| | | |
|---|---|---|
| 2008/0077673 A1* | 3/2008 | Thomas ................... 709/206 |
| 2009/0113472 A1 | 4/2009 | Sheth et al. |
| 2011/0069940 A1 | 3/2011 | Shimy et al. |
| 2011/0090168 A1 | 4/2011 | Goto et al. |
| 2011/0270673 A1* | 11/2011 | Lin et al. .................. 705/14.45 |
| 2012/0124456 A1* | 5/2012 | Perez et al. ................. 715/200 |
| 2012/0214505 A1* | 8/2012 | Kaido et al. .............. 455/456.1 |
| 2013/0101096 A1* | 4/2013 | Shaw ........................ 379/88.13 |
| 2013/0151608 A1* | 6/2013 | Wiseman et al. ............ 709/204 |

FOREIGN PATENT DOCUMENTS

| | | | |
|---|---|---|---|
| EP | 2315429 A1 | 4/2011 | |
| KR | 20110054291 A | 5/2011 | |
| KR | 20110119323 A | 11/2011 | |
| WO | WO 2010072863 A1 * | 7/2010 | ......... H04L 12/5895 |

OTHER PUBLICATIONS

Franciois Toutain et al: "Interpersonal context-aware communication services", IEEE Communications Magazine, IEEE Service Center, Piscataway, US, vol. 49 No. 1, Jan. 1, 2011 (Jan. 1, 2011), pp. 68-74, XP011341187, ISSN: 0163-6804, DOI: 10.1109/MCOM.2011.5681018 *p. 69-70*.

Chinese Application No. 201380025344.1, Office Action dated Jul. 13, 2016.

* cited by examiner

CONTENT DELIVERY SYSTEM WITH CONTENT SHARING MECHANISM AND METHOD OF OPERATION THEREOF

TECHNICAL FIELD

The present invention relates generally to a content delivery system, and more particularly to a system for content sharing mechanism.

BACKGROUND ART

Modern portable consumer and industrial electronics, especially client devices such as navigation systems, cellular phones, portable digital assistants, and combination devices, are providing increasing levels of functionality to support modern life including personalized content services. Research and development in the existing technologies can take a myriad of different directions.

As users become more empowered with the growth of personalized content service devices, new and old paradigms begin to take advantage of this new device space. There are many technological solutions to take advantage of this new device location opportunity. One existing approach is to evaluate user profile and location information to provide personalized content through a mobile device such as a cell phone, a smart phone, or a personal digital assistant.

Personalized content services allow users to create, transfer, store, and/or consume information in order for users to create, transfer, store, and consume in the "real world." One such use of personalized content services is to efficiently transfer or guide users to the desired product or service.

Content delivery system and personalized content services enabled systems have been incorporated in automobiles, notebooks, handheld devices, and other portable products. Today, these systems aid users by incorporating available, real-time relevant information, such as advertisement, entertainment, local businesses, or other points of interest (POI).

However, a content delivery system with a content sharing mechanism has become a paramount concern for the consumer. The inability decreases the benefit of using the tool.

Thus, a need still remains for a content delivery system with a content sharing mechanism. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a content delivery system including: detecting a person's presence for identifying a portable device; determining an audience type based on the person's presence for determining a content type presentable on a public device; and distributing a display content based on the audience type for displaying on the portable device, the public device, or a combination thereof.

The present invention provides a content delivery system, including: a detector module for detecting a person's presence for identifying a portable device; an audience module, coupled to the detector module, for determining an audience type based on the person's presence for determining a content type presentable on a public device; and a distribution module, coupled to the audience module, for distributing a display content based on the audience type for displaying on the portable device, the public device, or a combination thereof.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
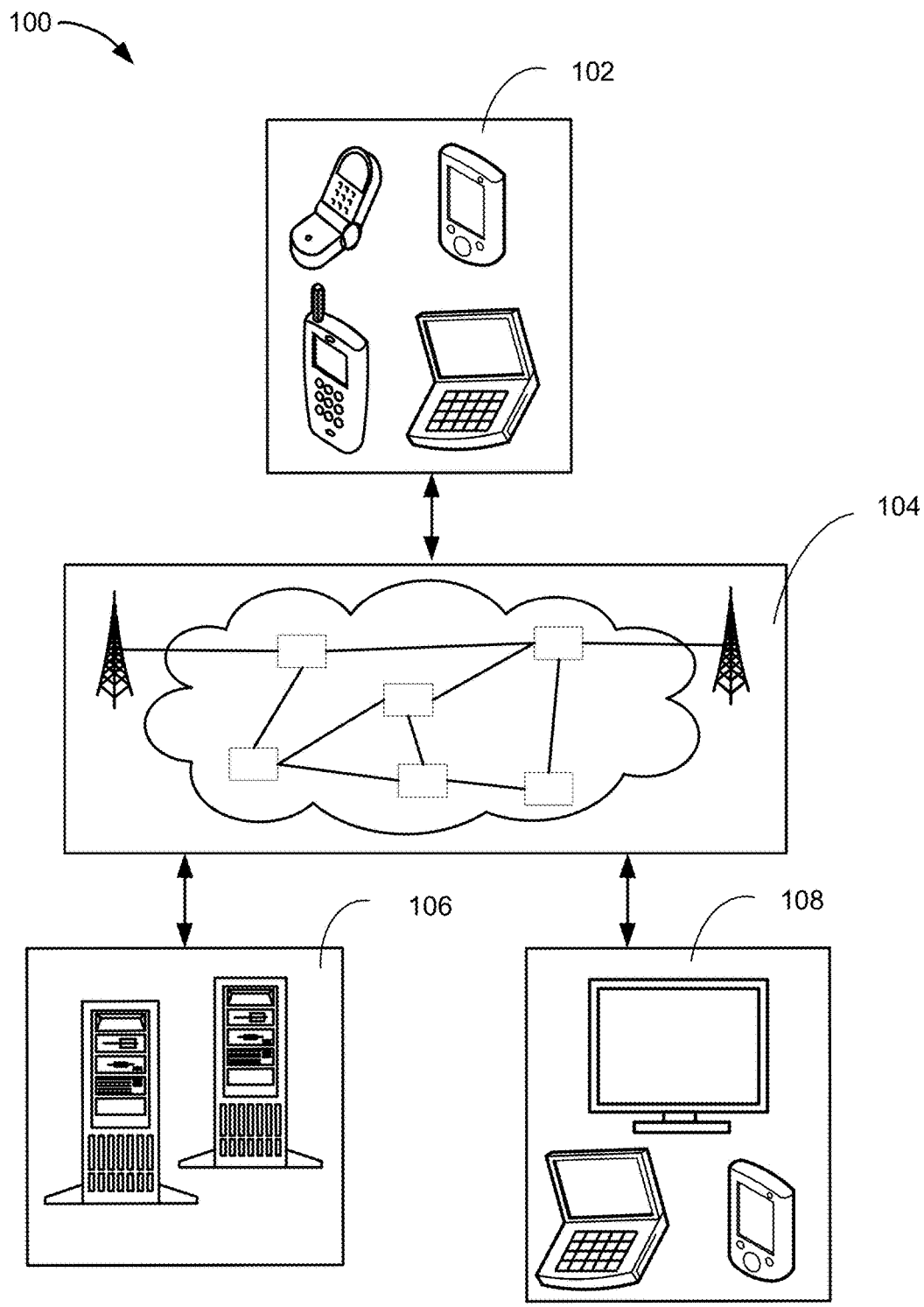
FIG. 1 is a content delivery system with content sharing mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention. Where multiple embodiments are disclosed and described having some features in common, for clarity and ease of illustration, description, and comprehension thereof, similar and like features one to another will ordinarily be described with similar reference numerals.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a content delivery system 100 with content sharing mechanism in an embodiment of the present invention. The content delivery system 100 includes a first device 102, such as a client or a server, connected to a second device 106, such as a client or server, with a communication path 104, such as a wireless or wired network. The content delivery system 100 can also include a third device 108 connected to the second device 106 with the communication path 104. The third device 108 can be a client or server.

For example, the first device 102 and the third device 108 can be of any of a variety of mobile devices, such as a cellular phone, personal digital assistant, a notebook computer, automotive telematic content delivery system, or other multi-functional mobile communication or entertainment device. The first device 102 and the third device 108 can be a standalone device, or can be incorporated with a vehicle, for example a car, truck, bus, or train. The first device 102 and the third device 108 can couple to the communication path 104 to communicate with the second device 106.

For illustrative purposes, the content delivery system 100 is described with the first device 102 and the third device 108 as a mobile computing device, although it is understood that the first device 102 and the third device 108 can be different types of computing devices. For example, the first device 102 and the third device 108 can also be a non-mobile computing device, such as a server, a server farm, or a desktop computer. For further example, the third device 108 can be a non-mobile computing device, such as a desktop computer, a large format display (LFD), a television (TV) or a computer terminal.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102 and the third device 108. The second device 106 can also be a client type device as described for the first device 102.

In another example, the first device 102 and the third device 108 can be a particularized machine, such as a mainframe, a server, a cluster server, rack mounted server, or a blade server, or as more specific examples, an IBM System z10 ™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, Samsung Galaxy™, or Moto Q Global™.

For illustrative purposes, the content delivery system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the content delivery system 100 is shown with the second device 106, the third device 108 and the first device 102 as end points of the communication path 104, although it is understood that the content delivery system 100 can have a different partition between the first device 102, the third device 108, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), near field communication (NFC), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
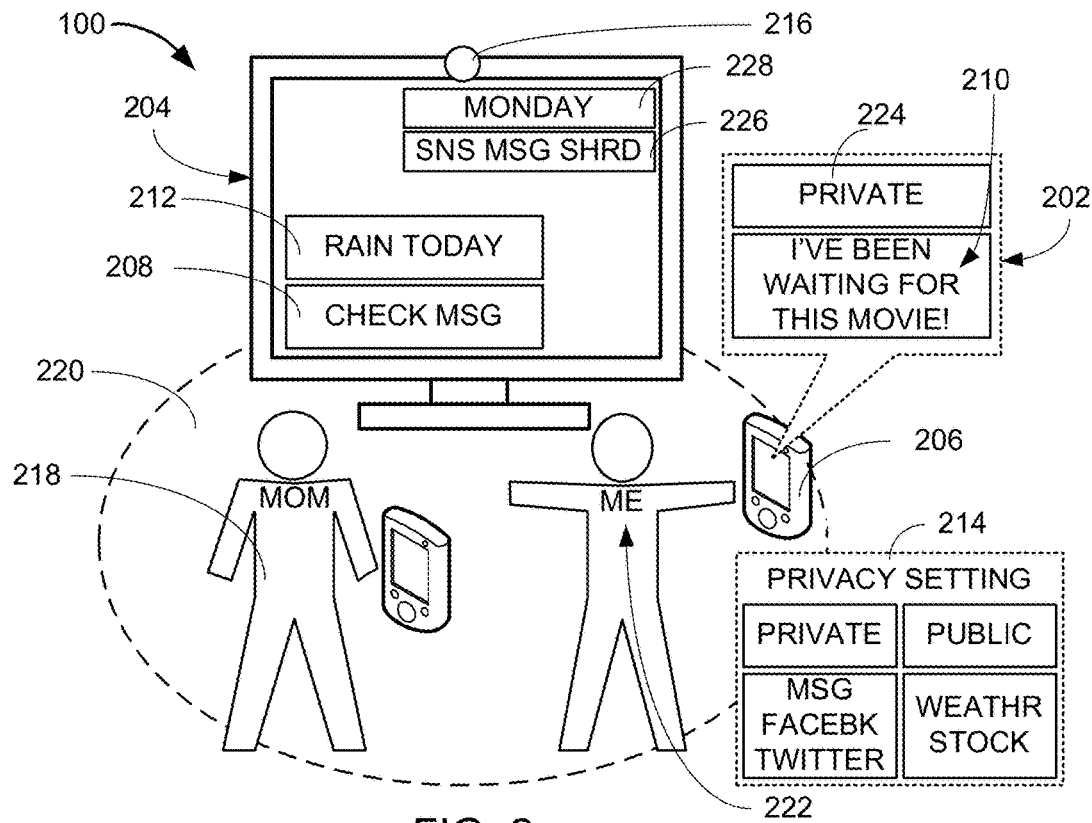
FIG. 2 is a first example of a distribution of a display content by the content delivery system.

Referring now to FIG. 2, therein is shown a first example of a distribution of a display content 202 by the content delivery system 100. For example, the content delivery system 100 can determine the display content 202 distributable and presentable on a public device 204, a portable device 206, or a combination thereof.

The portable device 206 is defined as a personal device that permits a private viewing of the display content 202. For example, the portable device 206 can include the first device 102 of FIG. 1. For brevity and clarity, the discussion of the present invention will focus on the content delivery system 100 generating the display content 202 specific to the user to the portable device 206. The private viewing can represent the viewing of the display content 202 only for the eyes of the user of the portable device 206.

The public device 204 is defined as a device that permits the viewing of the display content 202 available for all persons or the public. For example, the public device 204 can include the third device 108 of FIG. 1. For brevity and clarity, the discussion of the present invention will focus on the content delivery system 100 generating the display content 202 that can be shared with the public to the public device 204.

For specific example, the display content 202 can include information that is presentable on the public device 204, the portable device 206, or a combination thereof. More specifically, the display content 202 can include a TV program, a notification 208, digital pictures, instant messaging chats, social networking site (SNS) messages, or a combination thereof. For further example, the notification 208 can represent an alert that the user of the first device 102 had received an instant messaging, an email, SNS message, or a combination thereof.

The display content 202 can include a private content 210 and a public content 212. The private content 210 is defined as a content generated for the private viewing. The public content 212 is defined as the information made viewable and available to all people. For example, the private content 210 can include instant messaging chats and personal email. For another example, the public content 212 can include TV program aired on cable network. For further example, the notification 208 can replace the private content 210 for displaying on the public device 204 to avoid sharing the private content 210 to the public.

For specific example, the content delivery system 100 can present the display content 202 on the public device 204 to share the display content 202 to people in the vicinity of the public device 204. For further example, the public content 212 can represent the TV program. The public device 204 can display the TV program to viewers in the vicinity of the public device 204.

For another example, the user of the portable device 206 can register the portable device 206 to the content delivery system 100 to establish communication with the public device 204 via the communication path 104 of FIG. 1. For specific example, the portable device 206 can share the public content 212 received, generated, or a combination thereof by the portable device 206 to the public device 204. For different example, the public device 204 can share the public content 212 received, generated, or a combination thereof by the public device 204 to the portable device 206.

The content delivery system 100 can distribute the display content 202 based on a privacy setting 214, which is defined as a restriction placed for sharing the display content 202. The privacy setting 214 can be generated by the content delivery system 100 or set by the user. For example, the content delivery system 100 can generate the privacy setting 214 to share the public content 212 representing the weather information to the public device 204. For another example, the user of the portable device 206 can set the privacy setting 214 to restrict the sharing of the public content 212 representing a movie with profanity to the portable device 206.

The portable device 206 or the public device 204 can include a capturing sensor 216. For example, the capturing sensor 216 can detect a person's presence 218. The person's presence 218 is defined as the existence of a person. For example, the person's presence 218 can include the presence of the user of the portable device 206. For another example, the person's presence can include the presence of the person without the portable device 206. The capturing sensor 216 can also perform facial recognition of the user of the portable device 206.

The capturing sensor 216 can include a digital still or video camera for facial recognition, a digital scanner for finger print detection, or a combination thereof. For brevity and clarity, the discussion of the capturing sensor 216 will focus on the public device 204 with the capturing sensor 216 detecting the person's presence 218.

The capturing sensor 216 can detect the person's presence 218 within a detection zone 220. The detection zone 220 is defined as an area surrounding the portable device 206, the public device 204, or a combination thereof where the capturing sensor 216 can detect the person's presence 218. For example, the detection zone 220 can represent the five square meters in front of the public device 204. Details regarding the detection zone 220 will be discussed later.

The content delivery system 100 can distribute the display content 202 based on an audience type 222. The audience type 222 is defined as a categorization of the person detected by the capturing sensor 216. For example, the audience type 222 can include a friend of the user of the portable device 206. For another example, the user of the portable device 206 can set up a permission group based on the privacy setting 214 to permit the sharing of the display content 202 with the permission group. The group can represent a plurality of the person. The audience type 222 can represent the people in the permission group who were permitted to see the display content 202 shared.

For different example, the audience type 222 can include the categorization of the person based on the privacy setting 214 restricting who can receive the display content 202 distributed by the content delivery system 100. For example, the person who is not registered can represent the audience type 222 of an unregistered user as oppose to a registered user. For different example, the audience type 222 can include the "friend" category of the user of the portable device 206. Details regarding the distribution of the display content 202 based on the audience type 222 will be discussed later.

The content delivery system 100 can distribute the display content 202 based on a content type 224. The content type 224 is defined as a categorization of the display content 202. For example, the content type 224 can be categorized based on the Motion Picture Association of America (MPAA) film rating system. More specifically, the MPAA film rating can include "Parental Guidance Suggested" (PG) or "No One 17 and Under Admitted" (NC-17). For another example, the content type 224 can be categorized as educational, entertainment, or a combination thereof. For different example, the content type 224 can be categorized as the public content 212 or the private content 210.

FIG. 2 can illustrate the distribution of the display content 202 by the content delivery system 100. More specifically, the public device 204 with the capturing sensor 216 can detect a plurality of the person's presence 218. More specifically, the content delivery system 100 can determine the audience type 222 of each people detected within the detection zone 220. The audience type 222 can include the user of the portable device 206 and the mother of the user, who can represent the unregistered user.

The privacy setting 214 for the user of the portable device 206 can restrict the sharing of the private content 210, the message from the social networking site, such as Facebook™, to the public device 204 when the unregistered user is detected. The public device 204 can instead display the notification 208 on the public device 204 to notify the user of the portable device 206 that he or she had received the message from Facebook™.

Further, only the user of the portable device 206 can see the private content 210 on the portable device 206. The unregistered user, instead, can only see the notification 208 displayed on the public device 204.

An activity history 226 can represent a user's activity record of using the services provided by the content delivery system 100. For example, the activity history 226 can indicate that the user had shared the SNS message to other users within the detection zone 220 in the past. The activity history 226 can include a time information 228. The time information 228 can represent the time of the day, week, year, or a combination thereof when the user had used the services provided by the content delivery system 100.

Figure 3:
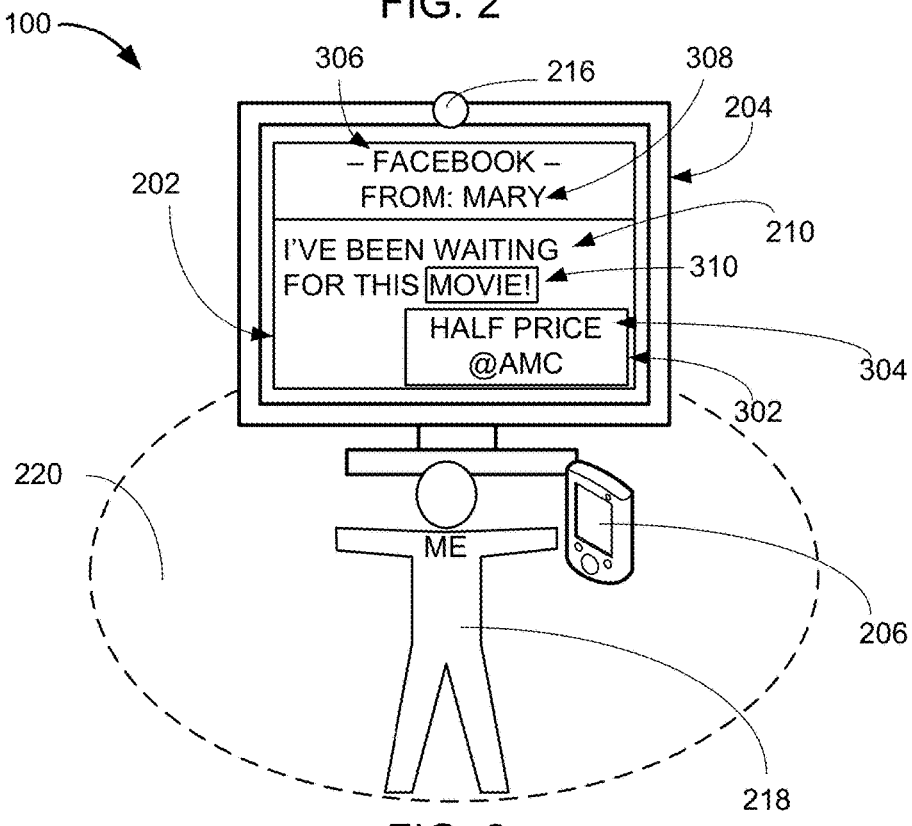
FIG. 3 is a second example of the distribution of the display content by the content delivery system.

Referring now to FIG. 3, therein is shown a second example of the distribution of the display content 202 by the content delivery system 100. For example, the content delivery system 100 can display the private content 210 on the public device 204. More specifically, the privacy setting 214 of FIG. 2 can indicate that the portable device 206 can share all of the display content 202 to the public device 204 if only the person's presence 218 representing the user of the portable device 206 is detected by the capturing sensor 216 within the detection zone 220. Subsequently, the public device 204 can display the private content 210 on the public device 204.

The display content 202 can include a content overlay 302. For example, the content overlay 302 can represent an advertisement overlaid on the private content 210, the public content 212 of FIG. 2, or a combination thereof. For specific example, the content overlay 302 can include an overlay advertising. The overlay advertising can include a video advertisement, a hypervideo, a contextual link, clickable graphic, text, or a combination thereof related to the display content 202.

For further example, the private content 210 displayed on the public device 204 can include an advertisement related to discount price for a movie ticket at a local theater. The content overlay 302 representing the advertisement of the discount price can be overlaid on the private content 210 to be displayed on the public device 204.

For further example, the content overlay 302 can represent information based on an overlay preference 304. For example, the overlay preference 304 can represent a choice whether to include the content overlay 302 or not with the display content 202. For different example, the overlay preference 304 can represent a type of information interested by the user of the content delivery system 100 to be displayed on the public device 204, the portable device 206, or a combination thereof. More specifically, in this example, the overlay preference 304 of the user can represent an interest in receiving information related to discount price. As a result, the content delivery system 100 can display the content overlay 302 that represents the advertisement for discount price for a movie theater.

The display content 202 can include a provider information 306. For example, the provider information 306 can represent information regarding a source of the display content 202. For specific example, Facebook™ can represent the provider information 306 for the SNS message.

The display content 202 can include a sender information 308. For example, the sender information 308 can represent information regarding the person, the entity, or a combination thereof who had transmitted the display content 202. For specific example, Mary, a Facebook™ user, can represent the sender of the SNS message. Thus, the sender information 308 can represent Mary.

The display content 202 can include a content keyword 310. For example, the content keyword 310 can represent a word, a phrase, or a combination thereof registered in the privacy setting 214. For specific example, the user can register the word "movie" as the content keyword 310 to the privacy setting 214.

Figure 4:
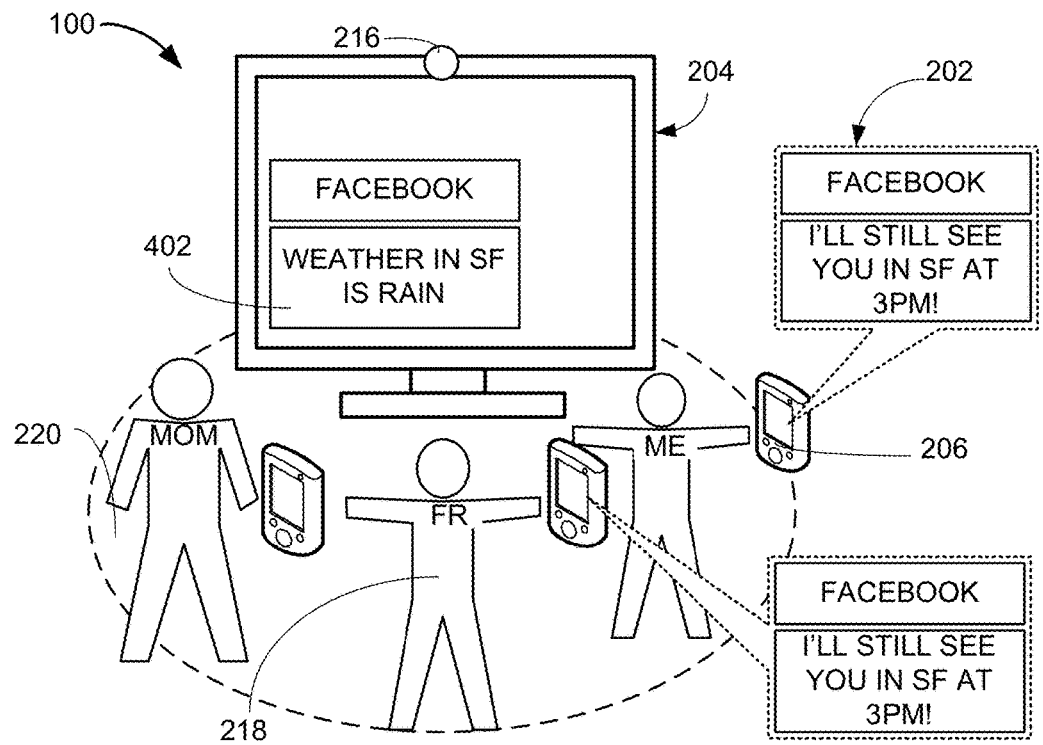
FIG. 4 is a third example of the distribution of the display content by the content delivery system.

Referring now to FIG. 4, therein is shown a third example of the distribution of the display content 202 by the content delivery system 100. For example, the privacy setting 214 of FIG. 2 can be configured on the public device 204. More specifically, the privacy setting 214 can restrict a subcontent 402 that is displayable on the portable device 206.

The subcontent 402 is defined as a portion of the display content 202. For example, the display content 202 can represent a hybrid that includes the private content 210 of FIG. 2 and the public content 212 of FIG. 2. For specific example, the display content 202 can represent "Weather in San Francisco, Calif. is rain. I'll still see you in San Francisco at 3 PM!" The privacy setting 214 can indicate that the private content 210 can display the private content 210 only on the portable device 206 and not on the public device 204. Further, the public content 212 can display on the public content 212.

Subsequently, the content delivery system 100 can partition the display content 202 to generate a plurality of the subcontent 402 that includes a private portion and the public portion of the display content 202. The private portion of the subcontent 402 can represent "I'll still see you in San Francisco at 3 PM. The public portion of the subcontent 402 can represent "Weather in San Francisco, Calif. is rain." Further, the subcontent 402 representing the private portion can be displayed on the portable device 206 and not on the public device 204. And the subcontent 402 representing the public portion can be displayed on the public device 204.

For another example, a parent of the user of the portable device 206 can restrict the display content 202 with violence to be displayable on the portable device 206. The content delivery system 100 can distribute the display content 202 to only share the subcontent 402 without the violence to the portable device 206.

For further example, the public device 204 can receive two sets of the display content 202 that is the same. More specifically, one of the display content 202 can be the original and the other of the display content 202 can be the variation. The original can include the violence and the variation can edit out the violence. The content delivery system 100 can distribute the display content 202 based on the privacy setting 214 to display which version of the display content 202 on the portable device 206.

For further example, the public device 204 can be connected to a plurality of the portable device 206. The capturing sensor 216 can detect the plurality of the person's presence 218 within the detection zone 220. The privacy setting 214 can restrict the display of the subcontent 402 to the plurality of the portable device 206. For specific example, some of the subcontent 402 representing the private portion of the display content 202 can be displayed on some of the portable device 206 while not shown on the some other of the portable device 206.

Figure 5:
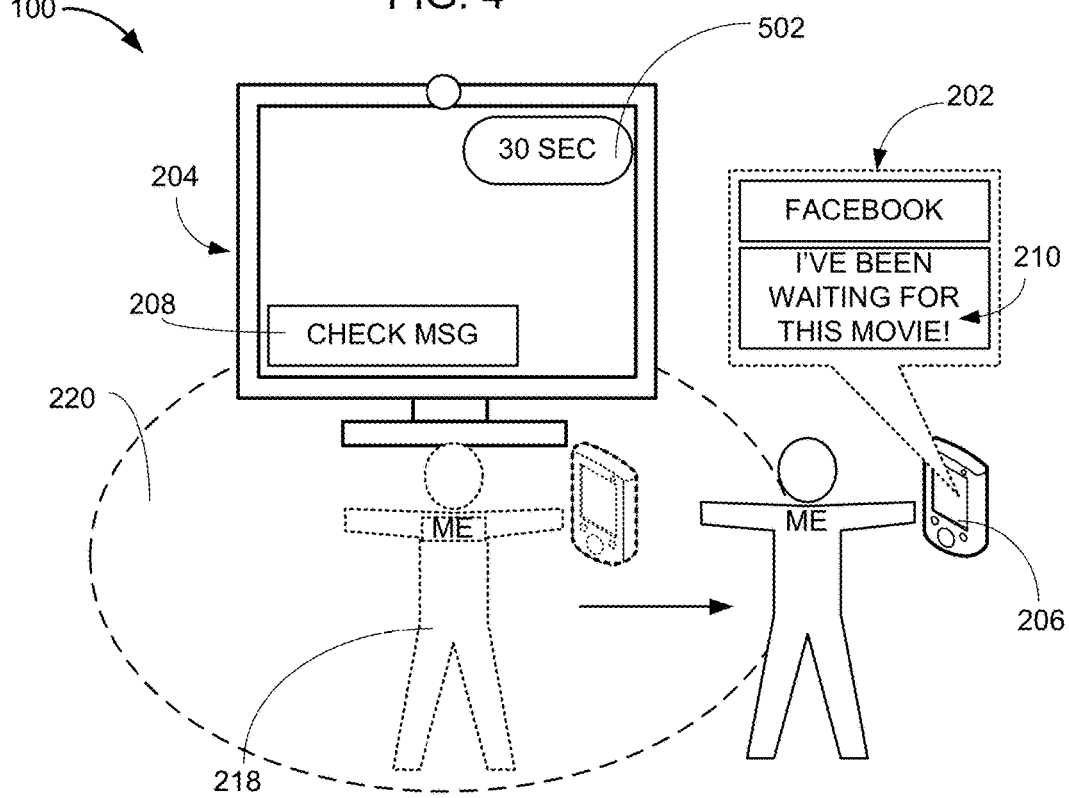
FIG. 5 is a fourth example of the distribution of the display content by the content delivery system.

Referring now to FIG. 5, therein is shown a fourth example of the distribution of the display content 202 by the content delivery system 100. For example, the content delivery system 100 can share the display content 202 from the portable device 206 to the public device 204 based on meeting or exceeding a time threshold 502.

The time threshold 502 is defined as a time limit placed on the person's presence 218 for being inside or outside of the detection zone 220. For example, the privacy setting 214 of FIG. 2 can limit the display of the display content 202 representing the private content 210, such as the SNS message, on the public device 204. If only the user of the portable device 206 is present within the detection zone 220, based on the privacy setting 214, the public device 204 can display the private content 210 on the public device 204.

However, if the person's presence 218 of the user is no longer detectable within the detection zone 220, the content delivery system 100 can switch to the notification 208 for displaying on the public device 204. For example, a past geographic location of the user of the portable device 206 within the detection zone 220 can be illustrated with dotted lines. Further, the time threshold 502 can be 30 seconds. The content delivery system 100 can continue to display the notification 208 on the public device 204 for 30 seconds. After the 30 seconds, the content delivery system 100 can determine that the time period not detecting the person's presence 218 exceeded the time threshold 502. Subsequently, the content delivery system 100 can disconnect the portable device 206 to stop sharing the display content 202.

For another example, the content delivery system 100 can display the private content 210 after the person's presence 218, representing only the user, within the detection zone 220 met or exceeded the time threshold 502. More specifically, the content delivery system 100 can track whether the person's presence 218 other than the user will also be detectable within the time threshold 502.

If after the time threshold 502, the person's presence 218 detected within the detection zone 220 is that of the user of the portable device 206, the content delivery system 100 can display the private content 210 on the public device 204. The time threshold 502 can be used by the content delivery system 100 to avoid inadvertent display of the private content 210 to confirm the non-presence of other people within the detection zone 220.

Figure 6:
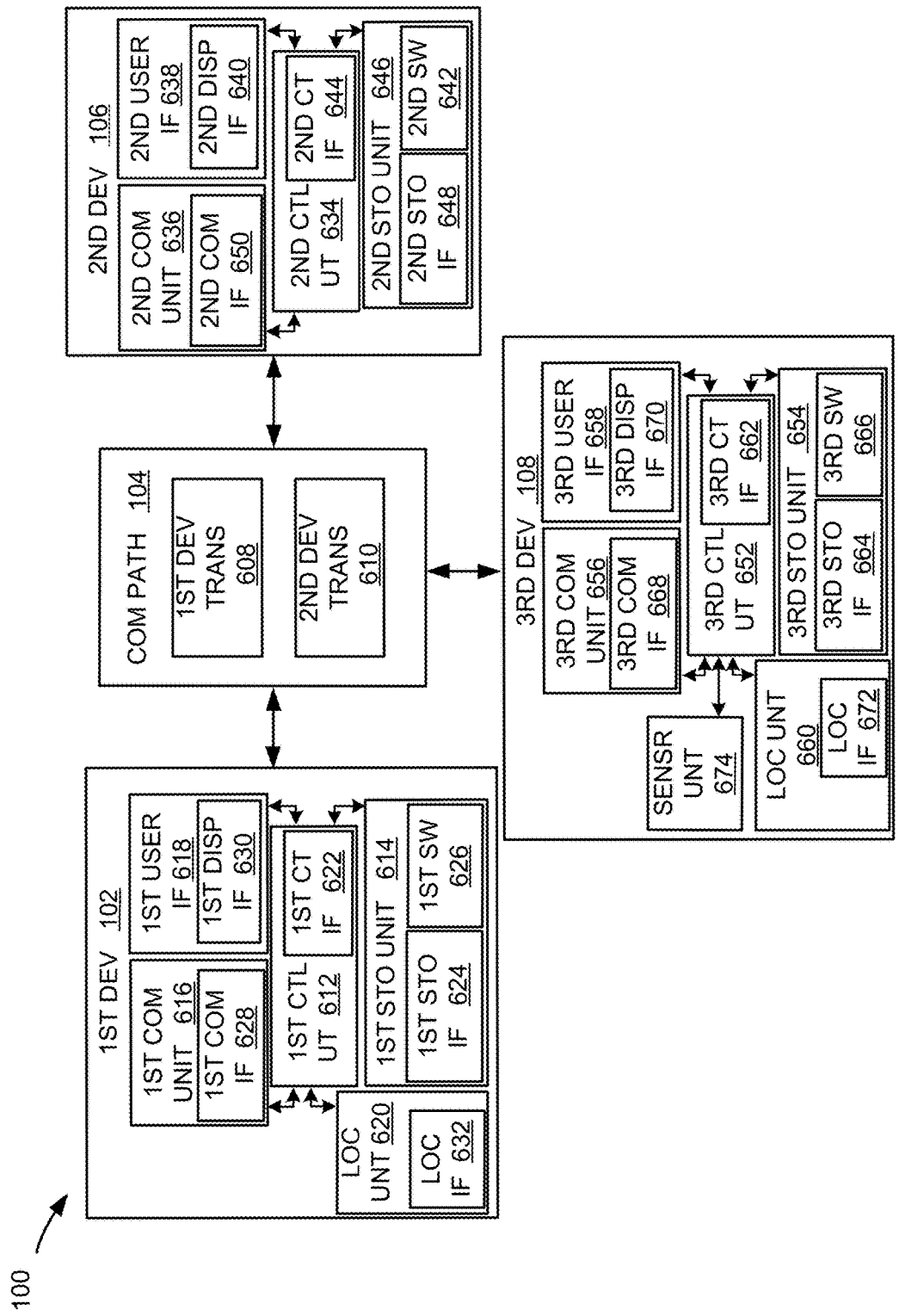
FIG. 6 is an exemplary block diagram of the content delivery system.

Referring now to FIG. 6, therein is an exemplary block diagram of the content delivery system 100. The content delivery system 100 can include the first device 102, the third device 108, the communication path 104, and the second device 106.

The first device 102 or the third device 108 can communicate with the second device 106 over the communication path 104. The first device 102 can send information in a first device transmission 608 over the communication path 104 to the second device 106. The second device 106 can send information in a second device transmission 610 over the communication path 104 to the first device 102.

For illustrative purposes, the content delivery system 100 is shown with the first device 102 or the third device 108 as a client device, although it is understood that the content delivery system 100 can have the first device 102 or the third device 108 as a different type of device. For example, the first device 102 or the third device 108 can be a server.

Also for illustrative purposes, the content delivery system 100 is shown with the second device 106 as a server, although it is understood that the content delivery system 100 can have the second device 106 as a different type of device. For example, the second device 106 can be a client device.

For brevity of description in this embodiment of the present invention, the first device 102 and the third device 108 will be described as a client device and the second device 106 will be described as a server device. The present invention is not limited to this selection for the type of devices. The selection is an example of the present invention.

The first device 102 can include a first control unit 612, a first storage unit 614, a first communication unit 616, a first user interface 618, and a location unit 620. The first control unit 612 can include a first control interface 622. The first control unit 612 can execute a first software 626 to provide the intelligence of the content delivery system 100. The first control unit 612 can be implemented in a number of different manners. For example, the first control unit 612 can be a processor, an embedded processor, a microprocessor, a hardware control logic, a hardware finite state machine (FSM), a digital signal processor (DSP), or a combination thereof. The first control interface 622 can be used for communication between the first control unit 612 and other functional units in the first device 102. The first control interface 622 can also be used for communication that is external to the first device 102.

The first control interface 622 can receive information from the other functional units or from external sources, or can transmit information to the other functional units or to external destinations. The external sources and the external destinations refer to sources and destinations physically separate to the first device 102.

The first control interface 622 can be implemented in different ways and can include different implementations depending on which functional units or external units are being interfaced with the first control interface 622. For example, the first control interface 622 can be implemented with a pressure sensor, an inertial sensor, a microelectromechanical system (MEMS), optical circuitry, waveguides, wireless circuitry, wireline circuitry, or a combination thereof.

The location unit 620 can generate location information, current heading, and current speed of the first device 102, as examples. The location unit 620 can be implemented in many ways. For example, the location unit 620 can function as at least a part of a global positioning system (GPS), an inertial navigation system, a cellular-tower location system, a pressure location system, or any combination thereof.

The location unit 620 can include a location interface 632. The location interface 632 can be used for communication between the location unit 620 and other functional units in the first device 102. The location interface 632 can also be used for communication that is external to the first device 102.

The location interface 632 can receive information from the other functional units or from external sources, or can transmit information to the other functional units or to external destinations. The external sources and the external destinations refer to sources and destinations physically separate to the first device 102.

The location interface 632 can include different implementations depending on which functional units or external units are being interfaced with the location unit 620. The location interface 632 can be implemented with technologies and techniques similar to the implementation of the first control interface 622.

The first storage unit 614 can store the first software 626. The first storage unit 614 can also store the relevant information, such as advertisements, points of interest (POI), navigation routing entries, or any combination thereof.

The first storage unit 614 can be a volatile memory, a nonvolatile memory, an internal memory, an external memory, or a combination thereof. For example, the first storage unit 614 can be a nonvolatile storage such as non-volatile random access memory (NVRAM), Flash memory, disk storage, or a volatile storage such as static random access memory (SRAM).

The first storage unit 614 can include a first storage interface 624. The first storage interface 624 can be used for communication between the location unit 620 and other functional units in the first device 102. The first storage interface 624 can also be used for communication that is external to the first device 102.

The first storage interface 624 can receive information from the other functional units or from external sources, or can transmit information to the other functional units or to external destinations. The external sources and the external destinations refer to sources and destinations physically separate to the first device 102.

The first storage interface 624 can include different implementations depending on which functional units or external units are being interfaced with the first storage unit 614. The first storage interface 624 can be implemented with technologies and techniques similar to the implementation of the first control interface 622.

The first communication unit 616 can enable external communication to and from the first device 102. For example, the first communication unit 616 can permit the first device 102 to communicate with the second device 106 of FIG. 1, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 628. The first communication interface 628 can be used for communication between the first communication unit 616 and other functional units in the first device 102. The first communication interface 628 can receive information from the other functional units or can transmit information to the other functional units.

The first communication interface 628 can include different implementations depending on which functional units are being interfaced with the first communication unit 616. The first communication interface 628 can be implemented with technologies and techniques similar to the implementation of the first control interface 622.

The first user interface 618 allows a user (not shown) to interface and interact with the first device 102. The first user interface 618 can include an input device and an output device. Examples of the input device of the first user interface 618 can include a keypad, a touchpad, soft-keys, a keyboard, a microphone, or any combination thereof to provide data and communication inputs.

The first user interface 618 can include a first display interface 630. The first display interface 630 can include a display, a projector, a video screen, a speaker, or any combination thereof.

The first control unit 612 can operate the first user interface 618 to display information generated by the content delivery system 100. The first control unit 612 can also execute the first software 626 for the other functions of the content delivery system 100, including receiving location information from the location unit 620. The first control unit 612 can further execute the first software 626 for interaction with the communication path 104 via the first communication unit 616.

The second device 106 can be optimized for implementing the present invention in a multiple device embodiment with the first device 102. The second device 106 can provide the additional or higher performance processing power compared to the first device 102. The second device 106 can include a second control unit 634, a second communication unit 636, and a second user interface 638.

The second user interface 638 allows a user (not shown) to interface and interact with the second device 106. The second user interface 638 can include an input device and an output device. Examples of the input device of the second user interface 638 can include a keypad, a touchpad, soft-keys, a keyboard, a microphone, or any combination thereof to provide data and communication inputs. Examples of the output device of the second user interface 638 can include a second display interface 640. The second display interface 640 can include a display, a projector, a video screen, a speaker, or any combination thereof.

The second control unit 634 can execute a second software 642 to provide the intelligence of the second device 106 of the content delivery system 100. The second software 642 can operate in conjunction with the first software 626. The second control unit 634 can provide additional performance compared to the first control unit 612.

The second control unit 634 can operate the second user interface 638 to display information. The second control unit 634 can also execute the second software 642 for the other functions of the content delivery system 100, including operating the second communication unit 636 to communicate with the first device 102 over the communication path 104.

The second control unit 634 can be implemented in a number of different manners. For example, the second control unit 634 can be a processor, an embedded processor, a microprocessor, a hardware control logic, a hardware finite state machine (FSM), a digital signal processor (DSP), or a combination thereof.

The second control unit 634 can include a second control interface 644. The second control interface 644 can be used for communication between the second control unit 634 and other functional units in the second device 106. The second control interface 644 can also be used for communication that is external to the second device 106.

The second control interface 644 can receive information from the other functional units or from external sources, or can transmit information to the other functional units or to external destinations. The external sources and the external destinations refer to sources and destinations physically separate to the second device 106.

The second control interface 644 can be implemented in different ways and can include different implementations depending on which functional units or external units are being interfaced with the second control interface 644. For example, the second control interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as advertisements, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the content delivery system 100 is shown with the second storage unit 646 as a single hierarchy storage system, although it is understood that the content delivery system 100 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as non-volatile random access memory (NVRAM), Flash memory, disk storage, or a volatile storage such as static random access memory (SRAM).

The second storage unit 646 can include a second storage interface 648. The second storage interface 648 can be used for communication between the location unit 620 and other functional units in the second device 106. The second storage interface 648 can also be used for communication that is external to the second device 106.

The second storage interface 648 can receive information from the other functional units or from external sources, or can transmit information to the other functional units or to external destinations. The external sources and the external destinations refer to sources and destinations physically separate to the second device 106.

The second storage interface 648 can include different implementations depending on which functional units or external units are being interfaced with the second storage unit 646. The second storage interface 648 can be implemented with technologies and techniques similar to the implementation of the second control interface 644.

The second communication unit 636 can enable external communication to and from the second device 106. For example, the second communication unit 636 can permit the second device 106 to communicate with the first device 102 over the communication path 104.

The second communication unit 636 can also function as a communication hub allowing the second device 106 to function as part of the communication path 104 and not limited to be an end point or terminal unit to the communication path 104. The second communication unit 636 can include active and passive components, such as microelectronics or an antenna, for interaction with the communication path 104.

The second communication unit 636 can include a second communication interface 650. The second communication interface 650 can be used for communication between the second communication unit 636 and other functional units in the second device 106. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second control interface 644.

The first communication unit 616 can couple with the communication path 104 to send information to the second device 106 in the first device transmission 608. The second device 106 can receive information in the second communication unit 636 from the first device transmission 608 of the communication path 104.

The second communication unit 636 can couple with the communication path 104 to send information to the first device 102 in the second device transmission 610. The first device 102 can receive information in the first communication unit 616 from the second device transmission 610 of the communication path 104. The content delivery system 100 can be executed by the first control unit 612, the second control unit 634, or a combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 106 can include other functional units not shown in FIG. 6 for clarity.

The third device 108 can include a third control unit 652, a third storage unit 654, a third communication unit 656, a third user interface 658, and a location unit 660. The third control unit 652 can include a third control interface 662. The third control unit 652 can execute a third software 666 to provide the intelligence of the content delivery system 100. The third control unit 652 can be implemented in a number of different manners. For example, the third control unit 652 can be a processor, an embedded processor, a microprocessor, a hardware control logic, a hardware finite state machine (FSM), a digital signal processor (DSP), or a combination thereof. The third control interface 662 can be used for communication between the third control unit 652 and other functional units in the third device 108. The third control interface 662 can also be used for communication that is external to the third device 108.

The third control interface 662 can receive information from the other functional units or from external sources, or can transmit information to the other functional units or to external destinations. The external sources and the external destinations refer to sources and destinations physically separate to the third device 108.

The third control interface 662 can be implemented in different ways and can include different implementations depending on which functional units or external units are being interfaced with the third control interface 662. For example, the third control interface 662 can be implemented with a pressure sensor, an inertial sensor, a microelectromechanical system (MEMS), optical circuitry, waveguides, wireless circuitry, wireline circuitry, or a combination thereof.

The location unit 660 can generate location information, current heading, and current speed of the third device 108, as examples. The location unit 660 can be implemented in many ways. For example, the location unit 660 can function as at least a part of a global positioning system (GPS), an inertial navigation system, a cellular-tower location system, a pressure location system, or any combination thereof.

The location unit 660 can include a location interface 672. The location interface 672 can be used for communication between the location unit 660 and other functional units in the third device 108. The location interface 672 can also be used for communication that is external to the third device 108.

The location interface 672 can receive information from the other functional units or from external sources, or can transmit information to the other functional units or to external destinations. The external sources and the external destinations refer to sources and destinations physically separate to the third device 108.

The location interface 672 can include different implementations depending on which functional units or external units are being interfaced with the location unit 660. The location interface 672 can be implemented with technologies and techniques similar to the implementation of the third control interface 662.

The third storage unit 654 can store the third software 666. The third storage unit 654 can also store the relevant information, such as advertisements, points of interest (POI), navigation routing entries, or any combination thereof.

The third storage unit 654 can be a volatile memory, a nonvolatile memory, an internal memory, an external memory, or a combination thereof. For example, the third storage unit 654 can be a nonvolatile storage such as non-volatile random access memory (NVRAM), Flash memory, disk storage, or a volatile storage such as static random access memory (SRAM).

The third storage unit 654 can include a third storage interface 664. The third storage interface 664 can be used for communication between the location unit 660 and other functional units in the third device 108. The third storage interface 664 can also be used for communication that is external to the third device 108.

The third storage interface 664 can receive information from the other functional units or from external sources, or can transmit information to the other functional units or to external destinations. The external sources and the external destinations refer to sources and destinations physically separate to the third device 108.

The third storage interface 664 can include different implementations depending on which functional units or external units are being interfaced with the third storage unit 654. The third storage interface 664 can be implemented with technologies and techniques similar to the implementation of the third control interface 662.

The third communication unit 656 can enable external communication to and from the third device 108. For example, the third communication unit 656 can permit the third device 108 to communicate with the second device 106 of FIG. 1, an attachment, such as a peripheral device or a computer desktop, and the communication path 104.

The third communication unit 656 can also function as a communication hub allowing the third device 108 to function as part of the communication path 104 and not limited to be an end point or terminal unit to the communication path 104. The third communication unit 656 can include active and passive components, such as microelectronics or an antenna, for interaction with the communication path 104.

The third communication unit 656 can include a third communication interface 668. The third communication interface 668 can be used for communication between the third communication unit 656 and other functional units in the third device 108. The third communication interface 668 can receive information from the other functional units or can transmit information to the other functional units.

The third communication interface 668 can include different implementations depending on which functional units are being interfaced with the third communication unit 656. The third communication interface 668 can be implemented with technologies and techniques similar to the implementation of the third control interface 662.

The third user interface 658 allows a user (not shown) to interface and interact with the third device 108. The third user interface 658 can include an input device and an output device. Examples of the input device of the third user interface 658 can include a keypad, a touchpad, soft-keys, a keyboard, a microphone, or any combination thereof to provide data and communication inputs.

The third user interface 658 can include a third display interface 670. The third display interface 670 can include a display, a projector, a video screen, a speaker, or any combination thereof.

The third control unit 652 can operate the third user interface 658 to display information generated by the content delivery system 100. The third control unit 652 can also execute the third software 666 for the other functions of the content delivery system 100, including receiving location information from the location unit 660. The third control unit 652 can further execute the third software 666 for interaction with the communication path 104 via the third communication unit 656.

A sensor unit 674 can detect the person's presence 218 of FIG. 2. For example, the sensor unit 674 can detect the person's presence within the detection zone 220 of FIG. 2. Examples of the sensor unit 674 can include a digital camera, video camera, thermal camera, night vision camera, infrared camera, x-ray camera, or the combination thereof. Further examples of the sensor unit 674 can include a facial recognition device, a finger print scanner, a retina scanner, a physiological monitoring device, light identifier, or a combination thereof. For specific example, the sensor unit 674 can include the capturing sensor 216 of FIG. 2.

Figure 7:
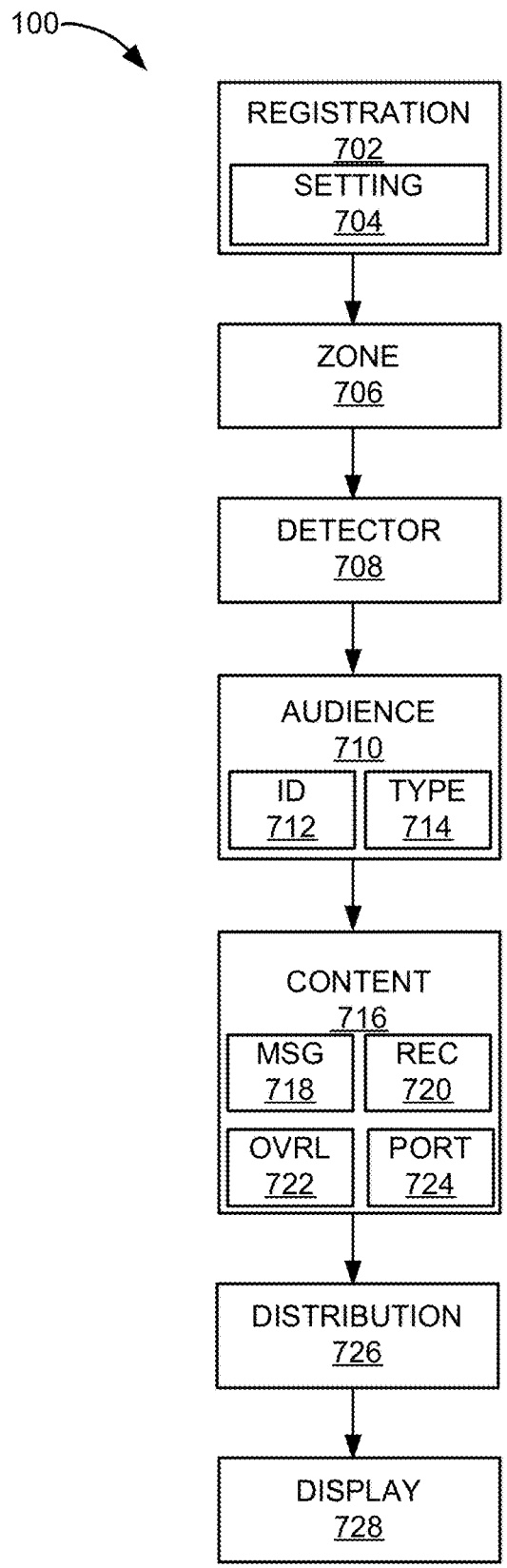
FIG. 7 is a control flow of the content delivery system.

Referring now to FIG. 7, therein is shown a control flow of the content delivery system 100. The content delivery system 100 can include a registration module 702. The registration module 702 registers the portable device 206 of FIG. 2 to be connected with the public device 204 of FIG. 2. For example, the registration module 702 can register the portable device 206 to connect with the public device 204 via the communication path 104 of FIG. 1.

The registration module 702 can register the portable device 206 in a number of ways. For example, the user of the portable device 206 can register the portable device 206 to share the display content 202 of FIG. 2 with the public device 204. For another example, a plurality of the user of the portable device 206 can register as a group to share the display content 202 with the public device 204.

The registration module 702 includes a setting module 704. The setting module 704 generates the privacy setting 214 of FIG. 2. The setting module 704 can generate the privacy setting 214 in a number of ways. For example, the setting module 704 can generate the privacy setting 214 for restricting the distribution of the private content 210 of FIG. 2 to the public device 204. For different example, the setting module 704 can generate the privacy setting 214 for restricting the distribution of the public content 212 of FIG. 2 to the portable device 206.

For another example, the setting module 704 can generate the privacy setting 214 based on the activity history 226 of FIG. 2. For specific example, the activity history 226 an include how the user had shared the display content 202 between the portable device 206 and the public device 204. More specifically, the user can always share the public content 212, such as the weather report received by the portable device 206, to the public device 204 in the past. The setting module 704 can generate the privacy setting 214 for sharing the public content 212 that represents the weather report.

For different example, the setting module 704 can generate the privacy setting 214 based on the time information 228 of FIG. 2. For specific example, the user of the portable device 206 can reject the display content 202 representing a horror movie from the public device 204 on Monday nights. The setting module 704 can generate the privacy setting 214 that rejects the sharing of horror movies on Monday nights between the portable device 206 and the public device 204.

For another example, the setting module 704 can generate the privacy setting 214 based on the audience type 222 of FIG. 2 for restricting the distribution of the display content 202. More specifically, the audience type 222 can represent the "friends of the user of the portable device 206." The activity history 226 of the user shows that user had shared the private content 210 with the audience type 222 of user's friend but had not shared to those who were not user's friends. As a result, the setting module 704 can generate the privacy setting 214 that allows the sharing of the private content 210 generated for the user only to other users with the audience type 222 of "friends of the user of the portable device 206."

For different example, the setting module 704 can generate the privacy setting 214 based on the number of the person's presence 218 of FIG. 2 detected within the detection zone 220 of FIG. 2. For example, the setting module 704 can increase or decrease a level of security based on the number of person's presence 218 detected. More specifically, the setting module 704 can generate the privacy setting 214 with a higher security as the number of the person's presence 218 detected increased. For example, if on the user was detected within the detection zone 220, the setting module 704 can generate the privacy setting 214 that allows the distribution of the private content 210 to the public device 204. However, if the person's presence 218 other than that of the user is detected, the setting module 704 can increase the security for distributing the display content 202 by generating the privacy setting 214 that shares the public content 212 to the public device 204 and the private content 210 to the portable device 206.

For different example, the setting module 704 can configure the privacy setting 214 for grouping the plurality of the audience type 222 permitted from displaying the display content 202. The audience type 222 can represent "family member of the user of the portable device 206." The privacy setting 214 can be set so that the display content 202 shared to the audience type 222 of user's friend versus the audience type 222 of user's family can differ. More specifically, the privacy setting 214 can set so that the user's family member can only receive the public content 212.

For further example, the privacy setting 214 can be set to restrict the sharing of the subcontent 402 of FIG. 4. More specifically, the display content 202 can include the plurality of the subcontent 402. The plurality of the subcontent 402 can represent the private portion and the public portion. The setting module 704 can generate the privacy setting 214 to share the subcontent 402 with the private portion of the display content 202 to be shared only on the portable device 206 based on the user's past activity.

For different example, the setting module 704 can configure the privacy setting 214 to restrict the sharing of the display content 202 based on the provider information 306 of FIG. 3 of the display content 202. More specifically, the provider information 306 can represent Facebook™. The setting module 704 can configure the privacy setting 214 to restrict display of the display content 202 provided by Facebook™ only to the portable device 206.

The setting module 704 can generate the privacy setting 214 based on the overlay preference 304 of FIG. 3. The overlay preference 304 can indicate that the user is interested in having the content overlay 302 of FIG. 3 of automobile advertisement with the display content 202. The setting module 704 can generate the privacy setting 214 to require the overlay of the content overlay 302 of the automobile advertisement with the display content 202 generated for the user.

The content delivery system 100 can include a zone module 706, which can be coupled to the registration module 702. The zone module 706 generates the detection zone 220. For example, the zone module 706 can generate the detection zone 220 to be five square meter in front of the capturing sensor 216 of FIG. 2. For different example, the zone module 706 can generate the detection zone 220 to be a connectivity range for the communication path 104 representing the Bluetooth connection between the portable device 206 and the public device 204. For another example, the zone module 706 can generate the detection zone 220 to be the area where the capturing sensor 216 can establish the facial recognition. More specifically, the specification of the capturing sensor 216 can indicate that the capturing sensor 216 can recognize a person's face that is within ten meters from the capturing sensor 216.

The content delivery system 100 can include a detector module 708, which can be coupled to the zone module 706. The detector module 708 detects the person's presence 218 of FIG. 2. For example, the detector module 708 can detect the person's presence 218 for identifying the portable device 206.

The detector module 708 can detect the person's presence 218 in a number of ways. For example, the detector module 708 can detect the person's presence 218 via the capturing sensor 216. For specific example, the capturing sensor 216 can represent the digital camera that can perform facial recognition. The detector module 708 can detect the person's presence 218 based on facial recognition if the user is within the detection zone 220.

For different example, the capturing sensor 216 can represent the finger print scanner to detect the user's finger print from the key pads of the portable device 206. The detector module 708 can detect the person's presence 218 within the detection zone 220 based on detecting the user's finger print and the portable device 206 having to establish the Bluetooth connection with the public device 204. Further, by having the portable device 206 establish connection with the public device 204 via the communication path 104, the detector module 708 can identify the portable device 206 as the portable device 206 registered by the user to the content delivery system 100.

The content delivery system 100 can include an audience module 710, which can be coupled to the detector module 708. The audience module 710 identifies the user of the portable device 206 and determines the audience type 222 of FIG. 2. For example, the audience module 710 can determine the audience type 222 based on the person's presence 218 for determining the content type 224 of FIG. 2 presentable on the public device 204.

The audience module 710 includes an identification module 712. The identification module 712 identifies the user of the portable device 206. The identification module 712 can identify the user in a number of ways. For example, the identification module 712 can identify the user of the portable device 206 based on comparing the facial image captured by the capturing sensor 216 to the facial image stored in the second storage unit 646 of FIG. 6. Further, the identification module 712 can match the facial image to the registered identity of the user for the portable device 206.

For different example, the identification module 712 can identify the user of the portable device 206 based on comparing the finger print information scanned by the capturing sensor 216 to the profiles of the finger prints stored within the first storage unit 614 of FIG. 6. As a result, the identification module 712 can identify the user of the portable device 206 within the detection zone 220. Further, the identification module 712 can match the finger print information to the registered identity of the user for the portable device 206.

The audience module 710 includes a type module 714. The type module 714 determines the audience type 222 of the person's presence 218 within the detection zone 220. The type module 714 can determine the audience type 222 in a number of ways.

For example, the type module 714 can determine the audience type 222 based on the privacy setting 214. The privacy setting 214 can include a category of users. For specific example, the privacy setting 214 can categorize the user who had registered the portable device 206 as the registered user. Further, the user of the portable device 206 can be identified based on facial recognition as discussed. Once the user's presence is detected within the detection zone 220, the type module 714 can determine the audience type 222 of the user that is identified to be the registered user.

In contrast, if another user is unregistered and his or her presence is detected within the detection zone 220, even if the identity of the another user is identified, the type module 714 can determine the audience type 222 of the another user to be the unregistered user. Further, if the identity of the another user is unidentifiable, the type module 714 can determine the audience type 222 of the another user to be the unregistered user.

For different example, the type module 714 can determine the audience type 222 to be one person or numerous people. The type module 714 can determine the audience type 222 to be an audience of one if the capturing sensor 216 only detects one of the person's presence 218 within the detection zone 220. In contrast, the type module 714 can determine the audience type 222 to be a group of persons if the capturing sensor 216 detects the plurality of the person's presence 218 within the detection zone 220.

The content delivery system 100 can include a content module 716, which can be coupled to the audience module 710. The content module 716 generates the display content 202 to be distributed to the portable device 206, the public device 204, or a combination thereof. The content module 716 can generate the display content 202 in a number of ways.

The content module 716 includes a message module 718. The message module 718 generates the notification 208 of FIG. 2. For example, the message module 718 can generate the notification 208 based on the audience type 222 for notifying the portable device 206, the public device 204, or a combination thereof.

For specific example, the portable device 206 can receive the private content 210, such as the SNS message. The audience type 222 determined within the detection zone 220 can include the registered user and the unregistered user. The privacy setting 214 can indicate that the SNS message will not be displayed on the public device 204. The message module 718 can generate the notification 208 for the public device 204 to display the notification 208 instead of the actual SNS message.

The content module 716 includes a receiver module 720. The receiver module 720 can receive the display content 202 for distribution. For example, the receiver module 720 for the portable device 206 can receive the private content 210, such as the SNS message, from the social networking site via the first control interface 622 of FIG. 6. The content module 716 can generate the display content 202 based on the SNS message received by the receiver module 720 for distributing to the public device 204.

For another example, the receiver module 720 for the public device 204 can receive the public content 212, the TV program. The TV program can include two variations: One can be the unedited version and the other can be the subcontent 402 of FIG. 4 with the profane language edited out. The content module 716 can generate the display content 202 based on the two variations of the TV program received by the receiver module 720 for distributing to the portable device 206.

The content module 716 includes an overlay module 722. The overlay module 722 generates the content overlay 302 over the display content 202 for distributing to the portable device 206, the public device 204, or a combination thereof. The overlay module 722 can generate the content overlay 302 in a number of ways.

For example, the display content 202 can represent "Cars," an American animated film produced by Pixar Animation Studio™ ("Pixar"). The display content 202 can include information, such as the provider information 306, the sender information 308 of FIG. 3, the content type 224, or a combination thereof. The provider information 306 can represent Pixar and the sender information 308 can represent Miramax, an American movie distributor. Further, the content type 224 can represent animation. Based on the provider information 306 and the content type 224, the overlay module 722 can generate the content overlay 302 representing a video advertisement for another animated film by Pixar over the display content 202.

For different example, the overlay module 722 can generate the content overlay 302 based on the audience type 222, the overlay preference 304, or a combination thereof. For specific example, the audience type 222 within the detection zone 220 can include the users with age 30 and age 15. The legal drinking age in the United States is over age of 21. The overlay preference 304 for the user who is 30 years old can represent advertisement related to alcohol. The overlay module 722 can generate the content overlay 302 based on the overlay preference 304 to overlay the advertisement for beer beverage over the private content 210 to be displayed to the portable device 206 for the 30 year old user. In contrast, the content overlay 302 representing the advertisement for beer beverage will not be generated for the portable device 206 for the 15 year old user or the public device 204.

It has been discovered that the present invention can generate the display content 202 based on the audience type 222 to improve the security to limit the generation of the display content 202 that is unsuitable for certain users. The consideration of the audience type 222 can tailor the generation of the display content 202 with the content overlay 302 that is suitable for each audience in the detection zone 220. As a result, the user can rely on the content delivery system 100 to filter the generation of the display content 202 to eliminate the risk of sharing the display content 202 that is unsuitable to certain users.

For different example, the overlay module 722 can generate the content overlay 302 based on the privacy setting 214. More specifically, the privacy setting 214 can indicate whether the content overlay 302 should be generated with the private content 210, the public content 212, or a combination thereof. For specific example, the privacy setting 214 can indicate that the content overlay 302 will be generated with the private content 210. The overlay module 722 can then consider what kind of the content overlay 302 should be generated with the private content 210. The overlay module 722 can consider the overlay preference 304 to determine the user's interest. As a result, continuing from the previous example, the overlay module 722 can generate the content overlay 302 representing a beer advertisement with the private content 210.

The content module 716 includes a portion module 724. The portion module 724 generates the subcontent 402. For example, the portion module 724 can generate the plurality of the subcontent 402 for separating a hybrid content that can include the private content 210 and the public content 212.

For specific example, the portion module 724 can generate the subcontent 402 based on the content keyword 310 of FIG. 3. More specifically, based on the content keyword 310, the portion module 724 can identify the portion of the display content 202 that can include the content type 224 of the private content 210 as oppose to the public content 212. For example, the portion module 724 can search for the contact keyword 310 within the display content 202. The display content 202 can include the content keyword 310, such as "weather" or "rain," to indicate that the sentence within the display content 202 is related to weather.

Further, the privacy setting 214 can bet so that the information related to weather as the public content 212. The portion module 724 can determine that the display content 202 with the content keyword 310 of "weather" to be the public content 212 and not the private content 210. As a result, the portion module 724 can generate the display content 202 with the sentence of the weather information as the subcontent 402 for the public content 212.

For different example, the portion module 724 can determine whether the subcontent 402 represents the private content 210 based on the sender information 308. More specifically, the private content 210, such as SNS message, can include the sender information 308, such as a name of the girlfriend. The privacy setting 214 can be set so that a message from a girlfriend can be categorized with the content type 224 of the private content 210.

Further, the context keyword 310 with meeting information and the time information 228 can be set as the private content 210 in the privacy setting 214. If the context of the display content 202 includes the sender information 308 and a plurality of the content keyword 310, such as "meeting at 3 PM," the portion module 724 can determine the subcontent 402 to be the private content 210. As a result, the portion module 724 can generate the display content 202 from the sender information 308 as the subcontent 402 for the private content 210. Additionally, the portion module 724 can generate the display content 202 with the meeting information and the time information 228 as the subcontent 402 for the private content 210.

The content delivery system 100 can include a distribution module 726, which can be coupled to the content module 716. The distribution module 726 distributes the display content 202. For example, the distribution module 726 can distribute the display content 202 based on the audience type 222 for displaying on the portable device 206, the public device 204, or a combination thereof.

The distribution module 726 can distribute the display content 202 in a number of ways. For example, the distribution module 726 can distribute the display content 202 based on the privacy setting 214. The privacy setting 214 can indicate that the private content 210 can be distributed to the portable device 206 and not to the public device 204. The SNS message can represent the private content 210. The distribution module 726 can distribute the private content 210 only to the portable device 206. Further, the distribution module 726 can distribute the notification 208, instead of the private content 210, to the public device 204.

For further example, the distribution module 726 can distribute the display content 202 based on the plurality of the audience type 222 for displaying the display content 202 different for each of the plurality of the portable device 206. More specifically, the privacy setting 214 can indicate that the private content 210 can be distributed to the audience type 222 of user's friend. In the plurality of the person's presence 218 detected, the plurality of the audience type 222 for the detected presence can include the user of the portable device 206, the user's friend, and the user's mother. The mother can be excluded from the audience type 222 of user's friend. The distribution module 726 can distribute the private content 210 to the portable device 206 of the user and the portable device 206 of the user's friend. However, based on the audience type 222, the distribution module 726 will not be triggered to distribute the private content 210 to the portable device 206 of the user's mother and the public device 204.

It has been discovered that the present invention can distribute the display content 202 based on the audience type 222 to filter the distribution of the private content 210, the public content 212, or a combination thereof to improve privacy for sharing the display content 202. The distribution of the display content 202 based on the audience type 222 restricts the viewer who can see the private content 210. Further, the restriction limits the inadvertent sharing of the private content 210 to unwanted viewers. As a result, the user can rely on the content delivery system 100 to avoid sharing the display content 202 to unwanted viewers, thus, improving the security of the privacy of the user.

For another example, the distribution module 726 can distribute the display content 202 based on the content type 224. The privacy setting 214 can indicate that the display content 202 with the content type 224 of violence and profanity will not be displayed on the public device 204. More specifically, the display content 202 with the content type 224 of violence and profanity can be distributed to the portable device 206. The distribution module 726 can distribute the display content 202 with the content type 224 of violence and profanity based on the privacy setting 214 only to the portable device 206.

It has been discovered that the content delivery system 100 can distribute the display content 202 based on the content type 224 to filter the distribution of the private content 210, the public content 212, or a combination thereof to improve privacy for sharing the display content 202. The distribution of the display content 202 based on the content type 224 restricts the sharing of the display content 202 that is unsuitable for certain viewers. Further, the restriction limits the inadvertent sharing of the display content 202 that may be unsuitable to some viewers. As a result, the user can enhance the user experience of using the content delivery system 100 for sharing the display content 202 with others without the worry of inadvertent sharing of the display content 202 that is unsuitable.

For different example, the distribution module 726 can distribute the display content 202 based on meeting or exceeding the time threshold 502 of FIG. 5. The privacy setting 214 can indicate that the time threshold 502 can be 30 seconds. Further, the privacy setting 214 can indicate that the private content 210 can be displayed on the public device 204 if the person's presence 218 of the user is within the detection zone 220.

Additionally, the distribution module 726 can distribute the display content 202 based on the person's presence 218 for displaying the display content 202 different from the person's presence 218 outside of the detection zone 220. More specifically, the privacy setting 214 can indicate that if the user's presence is no longer detected within the detection zone 220, the notification 208 can be displayed instead of the private content 210. Or the notification 208 can be displayed on the public device if the connection between the portable device 206 and the public device 204 is lost. And if the time period for a non-detection of the user's presence meets or exceeds the time threshold 502, the distribution module 726 can stop distributing the notification 208 to the public device 204.

For different example, the private content 210 can be displayed on the public device 204 after the time period of user's presence is detected within the detection zone 220 exceeds the time threshold 502. The privacy setting 214 can indicate that the switching of the display of the private content 210 from the portable device 206 to the public device 204 if the time period of the user's presence within the detection zone 220 meets or exceeds the time threshold 502. Based on the privacy setting 214 and the person's presence 218 of the user, the distribution module 726 can distribute the private content 210 to the public device 204.

It has been discovered that the present invention can distribute the display content 202 based on the meeting or exceeding the time threshold 502 to filter the distribution of the private content 210, the public content 212, or a combination thereof to improve privacy for sharing the display content 202. The distribution of the display content 202 based on the time threshold 502 limits the sharing of the display content 202 if the user of the portable device 206 is not detected within the detection zone 220. The restriction limits the inadvertent sharing of the display content 202 to the public without the presence of the user. As a result, the consideration of the time threshold 502 improves the security to avoid inadvertent sharing of the display content 202 when the user is not present within the detection zone 220.

For another example, the distribution module 726 can distribute the display content 202 based on the overlay preference 304 to the portable device 206, the public device 204, or a combination thereof. For specific example, the overlay preference 304 can indicate whether the user of the portable device 206 would like to have the content overlay 302 overlaid with the private content 210, the public content 212, or a combination thereof. Based on the overlay preference 304, the distribution module 726 can distribute the display content 202 with the content overlay 302 or not. As discussed above, the distribution module 726 can consider each of the factors above independently or in combination to determine whether to distribute the display content 202 to the portable device 206, the public device 204, or a combination thereof.

It has been discovered that the present invention can distribute the display content 202 based on the overlay preference 304 to filter the distribution of the content overlay 302 along with the private content 210, the public content 212, or a combination thereof. The distribution of the display content 202 with the content overlay 302 based on the overlay preference 304 improves the tailoring of the display content 202 to suit the user's interest. As a result, the user can reliably receive the display content 202 most interested by the user.

The content delivery system 100 can include a display module 728, which can be coupled to the distribution module 726. The display module 728 displays the display content 202 on the portable device 206, the public device 204, or a combination thereof. For example, the display module 728 can display the display content 202 on the portable device 206 different from the display content 202 displayed on the public device 204. For specific example, the display module 728 can display the notification 208 for the private content 210 on the public device 204. In contrast, the display module 728 can display the private content 210 on the portable device 206.

For another example, the display module 728 can display the display content 202 that is same on the portable device 206 and the public device 204. More specifically, the display module 728 can display the public content 212 both on the portable device 206 and the public device 204.

The physical transformation for entering the detection zone 220 results in movement in the physical world, such as people using the first device 102 of FIG. 6, the third device 108 of FIG. 6, or a combination thereof, based on the operation of the content delivery system 100. As the movement in the physical world occurs, the movement itself creates additional information that is converted back in to the person's presence 218, the audience type 222, the time threshold 502, the display content 202, or a combination thereof for the continued operation of the content delivery system 100 and to continue the movement in the physical world.

The first software 626 of FIG. 6 of the first device 102 of FIG. 6 can include the content delivery system 100. For example, the first software 626 can include the registration module 702, the zone module 706, the detector module 708, the audience module 710, the content module 716, the distribution module 726, and the display module 728.

The first control unit 612 of FIG. 6 can execute the first software 626 for the registration module 702 to generate the privacy setting 214. The first control unit 612 can execute the first software 626 for the zone module 706 generate the detection zone 220. The first control unit 612 can execute the first software 626 for the detector module 708 to detect the person's presence 218.

The first control unit 612 can execute the first software 626 for the audience module 710 to determine the audience type 222. The first control unit 612 can execute the first software 626 for the content module 716 to generate the display content 202. The first control unit 612 can execute the first software 626 for the distribution module 726 to distribute the display content 202. The first control unit 612 can execute the first software 626 for the display module 728 to display the display content 202.

The second software 642 of FIG. 6 of the second device 106 of FIG. 6 can include the content delivery system 100. For example, the second software 642 can include the registration module 702, the zone module 706, the detector module 708, the audience module 710, the content module 716, the distribution module 726, and the display module 728.

The second control unit 634 of FIG. 6 can execute the second software 642 for the registration module 702 to generate the privacy setting 214. The second control unit 634 can execute the second software 642 for the zone module 706 generate the detection zone 220.

The second control unit 634 can execute the second software 642 for the detector module 708 to detect the person's presence 218. The second control unit 634 can execute the second software 642 for the audience module 710 to determine the audience type 222.

The second control unit 634 can execute the second software 642 for the content module 716 to generate the display content 202. The second control unit 634 can execute the second software 642 for the distribution module 726 to distribute the display content 202. The second control unit 634 can execute the second software 642 for the display module 728 to display the display content 202.

The content delivery system 100 can be partitioned between the first software 626 and the second software 642. For example, the second software 642 can include the zone module 706, the detector module 708, the audience module 710, the content module 716, and the distribution module 726. The second control unit 634 can execute modules partitioned on the second software 642 as previously described.

The first software 626 can include the registration module 702 and the display module 728. Based on the size of the first storage unit 614 of FIG. 6, the first software 626 can include additional modules of the content delivery system 100. The first control unit 612 can execute the modules partitioned on the first software 626 as previously described.

The first control unit 612 can operate the first communication unit 616 of FIG. 6 to send the privacy setting 214 to the second device 106. The first control unit 612 can operate the first software 626 to operate the location unit 620 of FIG. 6. The second communication unit 636 of FIG. 6 can send the display content 202 to the first device 102 through the communication path 104 of FIG. 6.

The content delivery system 100 describes the module functions or order as an example. The modules can be partitioned differently. For example, the distribution module 726 and the content module 716 can be combined. Each of the modules can operate individually and independently of the other modules.

Furthermore, data generated in one module can be used by another module without being directly coupled to each other. For example, the content module 716 can receive the privacy setting 214 from the registration module 702. The registration module 702, the zone module 706, the detector module 708, the audience module 710, the content module 716, the distribution module 726, and the display module 728 can be implemented in as hardware accelerators (not shown) within the first control unit 612 or the second control unit 634, or can be implemented in as hardware accelerators (not shown) in the first device 102 or the second device 106 outside of the first control unit 612 or the second control unit 634.

Figure 8:
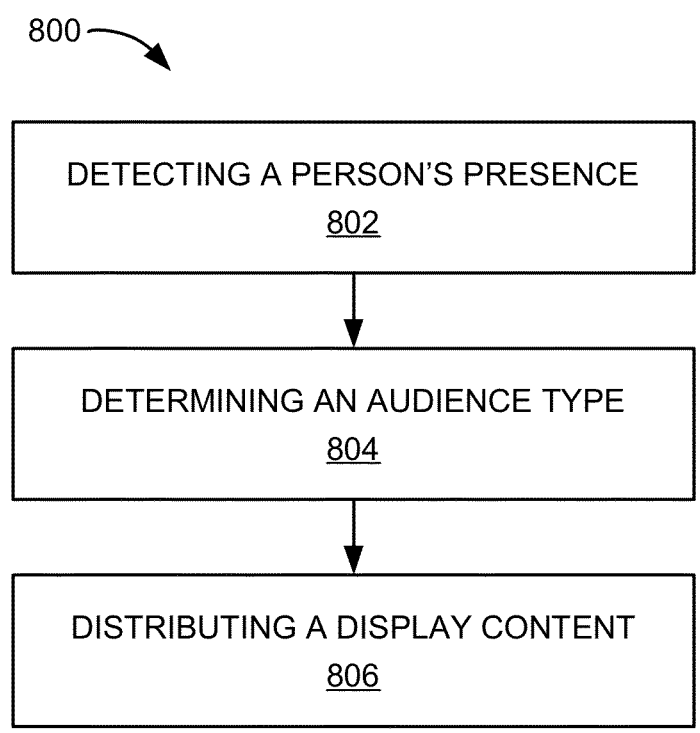
FIG. 8 is a flow chart of a method of operation of the content delivery system in a further embodiment of the present invention.

Referring now to FIG. 8, therein is shown a flow chart of a method 800 of operation of the content delivery system 100 of FIG. 1 in a further embodiment of the present invention. The method 800 includes: detecting a person's presence for identifying a portable device in a block 802; determining an audience type based on the person's presence for determining a content type presentable on a public device in a block 804; and distributing a display content based on the audience type for displaying on the portable device, the public device, or a combination thereof in a block 806.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a content delivery system comprising:
   detecting a person's presence with a capturing device for identifying a portable device;
   determining an audience type with a control unit according to the person's presence detected within a detection zone categorized under a privacy setting for identifying whether the person's presence represents a registered user or an unregistered user for determining a content type presentable on a public device;
   generating a display content with subcontents including a private content and a public content;
   distributing the display content based on the audience type and a time threshold for confirming the person's presence suitable for partitioning the subcontents from the display content to store the private content on the portable device and to send the public content on the public device;
   distributing the subcontents including the private content to the public device based on the audience type detected within the detection zone permitted under the privacy setting for displaying on the public device;
   displaying the subcontents including the private content to the public device when the audience type detected within the detection zone is the registered user; and
   restricting displaying the subcontents including the private content to the public device when the audience type detected within the detection zone is the unregistered user.

2. The method as claimed in claim 1 wherein distributing the display content includes distributing the public content based on the audience type for displaying on the public device.

3. The method as claimed in claim 1 wherein distributing the display content includes distributing the private content based on the audience type for displaying on the portable device.

4. The method as claimed in claim 1 further comprising displaying the public content, the private content, or a combination thereof for displaying on the portable device different from the display content displayed on the public device.

5. The method as claimed in claim 1 further comprising generating a privacy setting for differentiating the display content displayed on the portable device from the display content displayed on the public device.

6. The method as claimed in claim 1 wherein distributing the display content includes distributing the
   display content based on the audience type, the time threshold, and the content type for confirming the person's presence suitable for partitioning the subcontents from the display content to store the private content on the portable device and to send the public content on the public device.

7. The method as claimed in claim 6 wherein distributing the display content includes distributing the display content based on a plurality of the audience type for displaying the display content different for each of a plurality of the portable device.

8. The method as claimed in claim 6 further comprising generating a privacy setting for grouping a plurality of the audience type permitted for displaying the display content.

9. The method as claimed in claim 6 wherein distributing the display content includes generating a notification based on the audience type for displaying the notification on the portable device, the public device, or a combination thereof.

10. The method as claimed in claim 6 wherein:
   detecting the person's presence includes detecting the person's presence within a detection zone; and
   distributing the display content includes distributing the display content based on the person's presence for displaying the display content different from the person's presence outside of the detection zone.

11. A content delivery system comprising:
   a control unit configured to:
      detect a person's presence with a capturing device for identifying a portable device,
      determine an audience type according to the person's presence detected within a detection zone categorized under a privacy setting for identifying whether the person's presence represents a registered user or an unregistered user for determining a content type presentable on a public device,
      generating a display content with subcontents including a private content and a public content, and
   a communication interface, coupled to the control unit, configured to distribute the display content based on the audience type and a time threshold for confirming the person's presence suitable for partitioning the subcontents from the display content to store the private content on the portable device and to send the public content on the public device and to distribute the subcontents including the private content to the public device based on the audience type detected within the detection zone permitted under the privacy setting for displaying on the public device;
   wherein the subcontents including the private content are displayed to the public device when the audience type detected within the detection zone is the registered user;
   wherein the subcontents including the private content are restricted from displaying to the public device when the audience type detected within the detection zone is the unregistered user.

12. The system as claimed in claim 11 wherein the control unit is configured to distribute the public content based on the audience type for displaying on the public device.

13. The system as claimed in claim 11 wherein the control unit is configured to distribute the private content based on the audience type for displaying on the portable device.

14. The system as claimed in claim 11 wherein the control unit is configured to display the public content, the private content, or a combination thereof for displaying the display content on the portable device different from the content displayed on the public device.

15. The system as claimed in claim 11 wherein the control unit is configured to generate a privacy setting for differentiating the display content displayed on the portable device from the display content displayed on the public device.

16. The system as claimed in claim 11 wherein the control unit is configured to distribute the display content based on the audience type and the content type for displaying on the portable device, the public device, or a combination thereof.

17. The system as claimed in claim 16 wherein the control unit is configured to distribute the display content based on a plurality of the audience type for displaying the display content different for each of a plurality of the portable device.

18. The system as claimed in claim 16 wherein the control unit is configured to generate a privacy setting for grouping a plurality of the audience type permitted for displaying the display content.

19. The system as claimed in claim 16 wherein the control unit is configured to generate a notification based on the audience type for displaying the notification on the portable device, the public device, or a combination thereof.

20. The system as claimed in claim 16 wherein the control unit is configured to:
   detect the person's presence within a detection zone; and
   distribute the display content based on the person's presence for displaying the display content different from the person's presence outside of the detection zone.

* * * * *